United States Patent
Beals et al.

(10) Patent No.: US 11,019,109 B2
(45) Date of Patent: May 25, 2021

(54) DELIVERY OF NON-MULTIMEDIA CONTENT VIA A STANDARDIZED NETWORK ARCHITECTURE

(71) Applicant: DISH Technologies L.L.C., Englewood, CO (US)

(72) Inventors: William Michael Beals, Englewood, CO (US); Nicodemus Henry Nepper, Jr., Elbert, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 469 days.

(21) Appl. No.: 15/261,807

(22) Filed: Sep. 9, 2016

(65) Prior Publication Data

US 2016/0381084 A1 Dec. 29, 2016

Related U.S. Application Data

(63) Continuation of application No. 13/932,978, filed on Jul. 1, 2013, now abandoned.

(51) Int. Cl.
*G06F 15/16* (2006.01)
*H04L 29/06* (2006.01)
(Continued)

(52) U.S. Cl.
CPC ...... *H04L 65/1003* (2013.01); *H04L 12/2818* (2013.01); *H04L 65/1069* (2013.01);
(Continued)

(58) Field of Classification Search
CPC ............. H04L 65/1003; H04L 12/2818; H04L 65/1069; H04L 67/34; H04N 21/43615; H04N 21/85403; H04N 21/85406
See application file for complete search history.

(56) References Cited

U.S. PATENT DOCUMENTS 8,631,137 B2 * 1/2014 Douillet .............. H04L 12/2812
709/228
2003/0217100 A1 11/2003 Kronk
(Continued)

FOREIGN PATENT DOCUMENTS

EP 1 845 683 A1 10/2007
GB 2491176 A 11/2012

*Primary Examiner* — Ryan J Jakovac
(74) *Attorney, Agent, or Firm* — Seed IP Law Group LLP

(57) ABSTRACT

Non-multimedia information may be produced from devices such as alarms, appliances, automobiles, building systems, weather stations, home automation systems, and the like. A method and devices communicate non-multimedia content via a standardized network architecture. Non-multimedia data is received from a remote device with a standardized network aliasing device. The standardized network aliasing device is able to communicate on a network that conforms, for example, to a Digital Living Network Alliance (DLNA) protocol. The non-multimedia data is formatted with the standardized network aliasing device into a standardized-format file. The standardized-format file conforms to a selected media class. The standardized-format file is exposed on the network that conforms to the DLNA protocol and communicated to a remote DLNA-enabled device that is also coupled to the network that conforms to the DLNA protocol.

17 Claims, 8 Drawing Sheets

(51) Int. Cl.
  *H04N 21/436*  (2011.01)
  *H04L 12/28*  (2006.01)
  *H04L 29/08*  (2006.01)
  *H04N 21/854*  (2011.01)

(52) U.S. Cl.
  CPC ....... *H04L 67/34* (2013.01); *H04N 21/43615*
      (2013.01); *H04N 21/85403* (2013.01); *H04N*
      *21/85406* (2013.01)

(56) References Cited

U.S. PATENT DOCUMENTS

| | | |
|---|---|---|
| 2005/0204393 A1 | 9/2005 | Bopardikar et al. |
| 2007/0112939 A1 | 5/2007 | Wilson et al. |
| 2007/0220024 A1 | 9/2007 | Putterman et al. |
| 2007/0238471 A1 | 10/2007 | Bae et al. |
| 2009/0013241 A1 | 1/2009 | Kaminaga |
| 2009/0222422 A1* | 9/2009 | Yoon .................... H04L 12/2812 |
| 2009/0268754 A1 | 10/2009 | Palm et al. |
| 2011/0320559 A1* | 12/2011 | Foti ....................... H04L 65/605 |
| | | 709/217 |
| 2012/0122418 A1 | 5/2012 | Hicks, III |
| 2013/0063585 A1 | 3/2013 | Watanabe et al. |
| 2014/0007158 A1 | 1/2014 | Bhagwat |
| 2014/0324944 A1* | 10/2014 | Christopher .......... H04L 67/025 |
| | | 709/203 |

\* cited by examiner

DELIVERY OF NON-MULTIMEDIA CONTENT VIA A STANDARDIZED NETWORK ARCHITECTURE

BACKGROUND

Technical Field

The present disclosure generally relates to the generation of multimedia content by a non-multimedia device and more particularly, but not exclusively, relates to outputting the generated multimedia content with a device that conforms to a Digital Living Network Alliance (DLNA) standard.

Description of the Related Art

The Digital Living Network Alliance (DLNA) is an organization of electronic device manufacturers. The DLNA organization was originally formed in 2003 to create a common, standards-based structure through which consumers of digital, multimedia content (e.g., photos, music, and videos) could share the content amongst a variety of networked electronic devices. The standards are generally directed toward home-based networks to which the electronic devices are coupled. The electronic devices are enabled to generate, consume, and communicate multimedia content.

A manufacturer may submit a device for a certification that the device is compliant with the DLNA organization's "DLNA Networked Device Interoperability Guidelines." Volume 1 of the Guidelines covers "Architectures and Protocols." Volume 2 of the Guidelines covers "Media Format Profiles." If a device passes DLNA compliance testing, the manufacturer can submit a license request for the device to carry a DLNA certification mark.

A DLNA system is built on the well known Universal Plug and Play (UPnP) network architecture. UPnP architecture includes established network protocols that permit a wide range of electronic devices (e.g., personal computers, storage devices, scanners, printers, Internet gateways, Wi-Fi access points, mobile devices, game systems, media content servers, mobile phones, media players, cameras, and the like) to efficiently discover each other's presence on the network with little or no user intervention (i.e., automatic, zero-configuration, "invisible" networking). Once discovered, the devices are permitted to use a common set of functional network services to share information about their capabilities and their data. Accordingly, a UPnP device can dynamically join a network, obtain an Internet Protocol (IP) address, convey its capabilities, and learn about the presence and capabilities of other devices. A UPnP device can also be removed from the network abruptly or gracefully without leaving any unwanted state artifacts behind.

UPnP infrastructure standards are promoted by the UPnP Forum, which is an initiative of computing industry hardware, software, and computing service providers to enable easy connectivity between the network-enabled devices of hundreds of different vendors. UPnP is presently published as a multi-part international standard, ISO/IEC 29341-1: 2011. The standard continues evolve.

UPnP is intended primarily but not exclusively for ad hoc, unmanaged networks such as those typically formed as a residential network in a home, a small business, or in a public space. The network can be closed or open (i.e., attached to the Internet). The network can include wired and wireless communication paths.

UPnP technology leverages TCP/IP and other conventional Web technologies to enable seamless "plug-and-play" networking. Some technologies found in UPnP architecture networks include Internet protocols such as IP, TCP, UDP, HTTP, XML, and SOAP. If available, Dynamic Host Configuration Protocol (DHCP) and Domain Name System (DNS) servers may optionally also be used.

In addition to conformance with a UPnP network, a DLNA compliant system may optionally include one or more home network devices, mobile handheld devices, and home infrastructure devices that each conform to one of a plurality of certified device classes. Recognized DLNA device classes and some exemplary DLNA-enabled devices are listed in Table 1.

TABLE 1

DLNA Device Classes & Exemplary Devices

| | | |
|---|---|---|
| Home Network Device (HND) Category | | |
| Digital Media Server | DMS | Personal computer (PC), Network Attached Storage Device (NAS), DVD or Blu-Ray player, set top box |
| Digital Media Player | DMP | Certain televisions, home theater systems, game consoles |
| Digital Media Renderer | DMR | Certain televisions, audio/video receivers, remote speakers, surround sound systems, digital photo frame |
| Digital Media Controller | DMC | Intelligent remote control, smartphone or tablet having particular software application |
| Digital Media Printer | DMPr | Certain photo or all-in-one printers |
| Mobile Handheld Device (MHD) Category | | |
| Mobile Digital Media Server | M-DMS | Smartphones, portable media players |
| Mobile Digital Media Player | M-DMP | Smartphones, tablet devices, portable media players |
| Mobile Digital Media Controller | M-DMC | Smartphone, tablet |
| Mobile Digital Media Uploader | M-DMU | Digital camera, camcorder, smartphone, tablet |
| Mobile Digital Media Downloader | M-DMD | Portable music player, smartphone, tablet, |
| Home Interoperability Device (HID) Category | | |
| Mobile Interoperability Unit | MIU | Customized tools |
| Mobile Network Connectivity Function | M-NCF | WiFi Access Point |

Digital Media Servers (DMS) store multimedia content and make the content available via the UPnP network to DMP devices, M-DMP devices, DMR devices, and DMPr devices.

A Digital Media Player (DMP) locates multimedia content offered by a DMS or an M-DMS and consumes the content by "playing it" (e.g., playing a song file) or "rendering it" (e.g., displaying an image file). Typically, a DMP is not visible to other devices on the network such as a DMC or an M-DMC because a DMP device does not store or produce content to be shared.

Digital Media Renderer (DMR) products are similar to DMPs in that they render or play content received from a DMS or an M-DMS. Generally speaking, however, a DMR is unable to find content on the network automatically. Instead, a DMR must be set up by a DMC or an M-DMC. A combination DMP/DMR device can either find a DMS on its own to retrieve multimedia content or DMP/DMR device can be controlled by an external DMC or M-DMC.

Digital Media Controller (DMC) devices find multimedia content shared by a DMS or an M-DMS and match the content to the rendering capabilities of a DMR. The DMC device then sets up a connection between the DMS and DMR.

Digital Media Printers (DMPr) provide printing services for devices on the DLNA network. For example, photos can be printed with a DMPr, but a facsimile or email capability may also be included in a DMPr. Some examples of DMPr devices include a networked photo printer and a networked all-in-one printer.

The device classes in the MHD category are mobile counterparts to the DMS, DMP, DMR, and DMC device classes of the HND category. For example, Mobile Digital Media Servers (M-DMS) store multimedia content and make the content available in a manner along the lines of a DMS. Mobile Digital Media Players (M-DMP) find content offered by a DMS or M-DMS and provide playback and rendering capabilities. M-DMPs are generally not visible to other devices on the network such as Digital Media Controllers (DMC). Mobile Digital Media Controllers (M-DMC) find multimedia content offered by a DMS or an M-DMS and match the content to the rendering capabilities of a DMR, setting up the connections between the server and renderer. A Mobile Digital Media Uploader (M-DMU) device has with upload functionality. The M-DMU sends content to a DMS or an M-DMS. A Mobile Digital Media Downloader (M-DMD) device can play the downloaded multimedia content locally on the M-DMD. The M-DMD finds and downloads multimedia content exposed by a DMS or an M-DMS. A portable music player is an example of a M-DMD device. The mobile class (M-DMS, M-DMP, M-DMC, M-DMU, M-DMD) devices typically support formats more closely aligned with conventional mobile protocols, standards, and practices.

The Home Infrastructure Device (HID) category includes a translation device class and bridging device class. A Mobile Interoperability Unit (MIU) device provides reformatting of media content between HND (home) devices (DMS, DMP, DMC, DMU, DMD, DMPr) and MHD (mobile) devices (M-DMS, M-DMP, M-DMC, M-DMU, M-DMD) when such conversions are necessary. Mobile Network Connectivity Function (M-NCF) devices are used to connect the home network with the mobile device. In some cases, the M-NCF devices provide a WiFi (e.g., IEEE 802.11 based wireless connectivity) interface between the home network and the wireless device.

The devices of a DLNA system can share multimedia content of the types provided in Volume 2 of the DLNA Networked Device Interoperability Guidelines, Media Format Profiles. The content is encoded and formatted in explicit detail for three Media Classes (Image, Audio, and Audio-Visual). Profiles for the classes include detailed attributes, parameters, system-level details, compression-level details and the like to ensure interoperability between DLNA-certified devices. In addition to some mandatory formats, other optional formats are also defined in the Interoperability Guidelines standard and some manufacturers optionally support yet additional multimedia formats for photos, music, and video. Table 2 identifies the mandatory formats and some exemplary optional formats for each media class.

TABLE 2

DLNA Media Classes and Mandatory & Optional Formats

| Media Class | Mandatory Format | Optional Format |
| --- | --- | --- |
| Image | JPEG | PNG, GIF, TIFF, MPO |
| Audio | LPCM | AC3, AAC, MP3, WMA9, ATR AC3+ |
| Audio/Video | MPEG-2 | MPEG-1, MPEG-4, VC1, MPV1, Xvid, DivX, WMV, AVCHD |

FIG. 1 is a conventional DLNA system 10. A Universal Plug and Play Network (UPnP) 12 permits the communicative coupling of a plurality of DLNA-enabled devices. Included in the network 12 are a smart TV 14, a receiving device 16 (e.g., set top box), a media player 18, a wireless (WiFi) router 20, a media server 22, a desktop or other conventional computer 24, a printer 26, a portable (e.g., laptop) computer 28, a video camera 30, a digital still camera 34, a gaming device 36, and an audio system 38 (e.g., surround sound).

In the embodiment, the receiving device 16, media server 22, computer 24, and laptop 28 are configured as DLNA digital media server (DMS) devices. The DMS devices each have the capability to store image, audio, and audio/video media that is consumable by a various digital media player (DMP) devices and digital media renderer (DMR). The computer 24 and laptop 28 are further configured as digital media controller devices (DMC). That is, the computer 24 and laptop 28 are configured to set up and find content hosted on the network by a DMS device that matches the rendering capabilities of a particular DMR device. The computer 24 and laptop 28 set up a DLNA connection between a DMS device and the particular DMR device.

Still considering FIG. 1, the TV 14 and gaming device 36 are DMP devices. The audio system 38 is a DMR device directed by one or more DMC devices to play audio content, and the printer 26 is a digital media printer (DMPr) that is also directed by a DMC device to print certain types of DLNA media class content. The media player 18, video camera 30, and digital still camera 34 are mobile devices that also serve content (M-DMS) to DLNA enabled devices. The mobile devices are coupled to the network 12 via WiFi router 20.

BRIEF SUMMARY

A new Digital Living Network Alliance (DLNA) aliasing apparatus operates in conjunction with a communications network coupling DLNA capable devices. The DLNA aliasing apparatus provides a DLNA interface and a non-DLNA interface. DLNA compatible devices may operate to retrieve data from the DLNA aliasing apparatus. Alternatively or in addition, DLNA compatible devices may operate to send data to the DLNA aliasing apparatus. The DLNA aliasing apparatus also may retrieve data and alternatively or in addition send data to a non-DLNA compatible device. The communication of data between the DLNA aliasing apparatus and the non-DLNA compatible device may be via the network or via some other communication medium.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
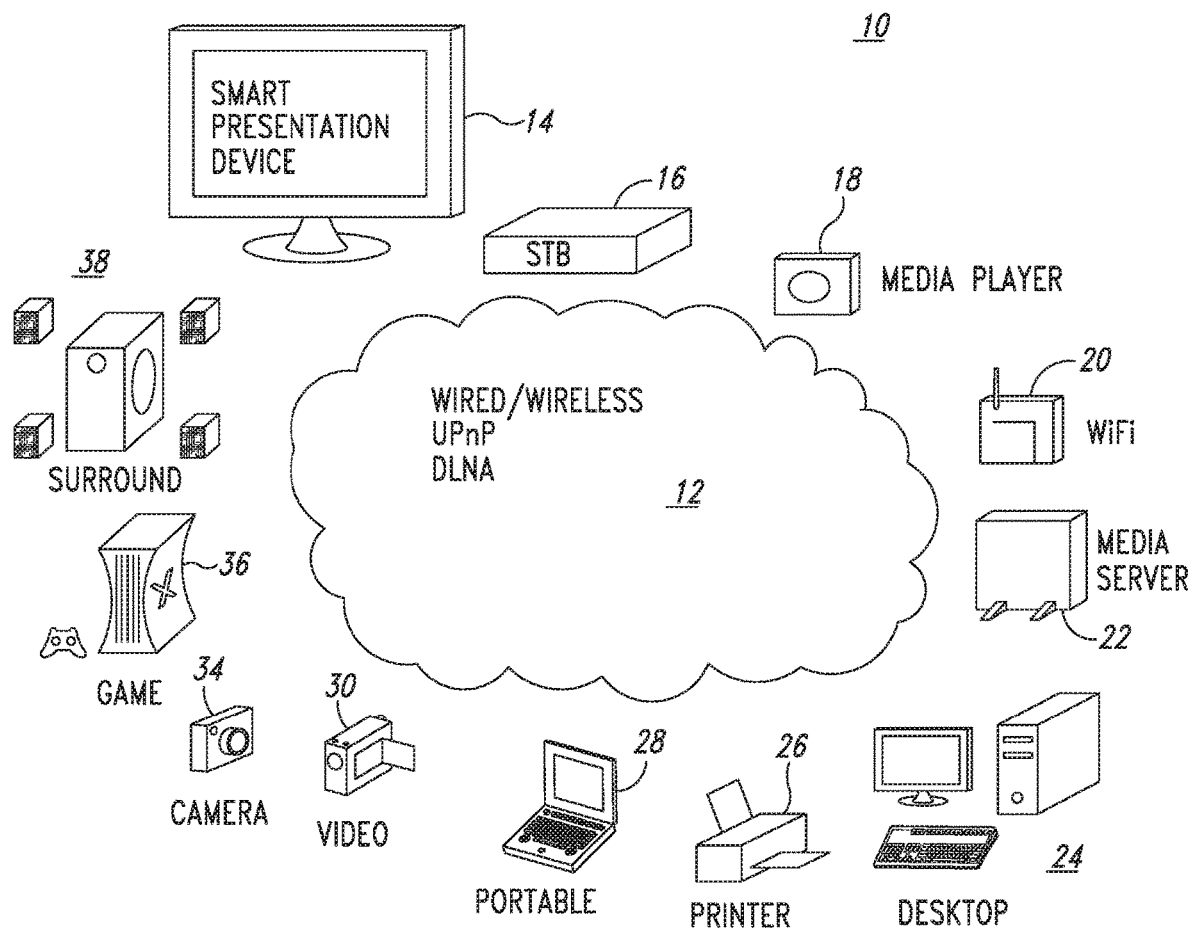
FIG. 1 is a conventional DLNA system.

The conventional devices and methods used to build and operate DLNA networks of the type presented in FIG. 1 are restricted to well-defined computing devices. The devices of many different manufacturers interoperate with little or no direct collaboration between the manufacturers, but the DLNA-enabled devices available today are lacking.

The present disclosure provides new Digital Living Network Alliance (DLNA) devices and new methods to communicate with the new DLNA devices. Generally speaking, the new DLNA devices are configured to generate or capture non-DLNA content and transform that content for playback, rendering, discovery, and sharing with a conventional DLNA-enabled device. A DLNA-aliasing device is discoverable on a network (e.g., a Universal Plug and Play (UPnP) network) of a DLNA system. In some cases, the aliasing device appears as a DLNA aliasing server (DAS), and in other cases, the aliasing device appears on the network as a DLNA aliasing controller (DAC). In still other cases, the aliasing device can appear on the network as a DLNA aliasing player (DAP) or renderer (DAR). The DLNA aliasing device can also appear as a mobile device. When the aliasing device is discovered on the network, the aliasing device appears to other DLNA-enabled devices to be one of their own.

Figure 2:
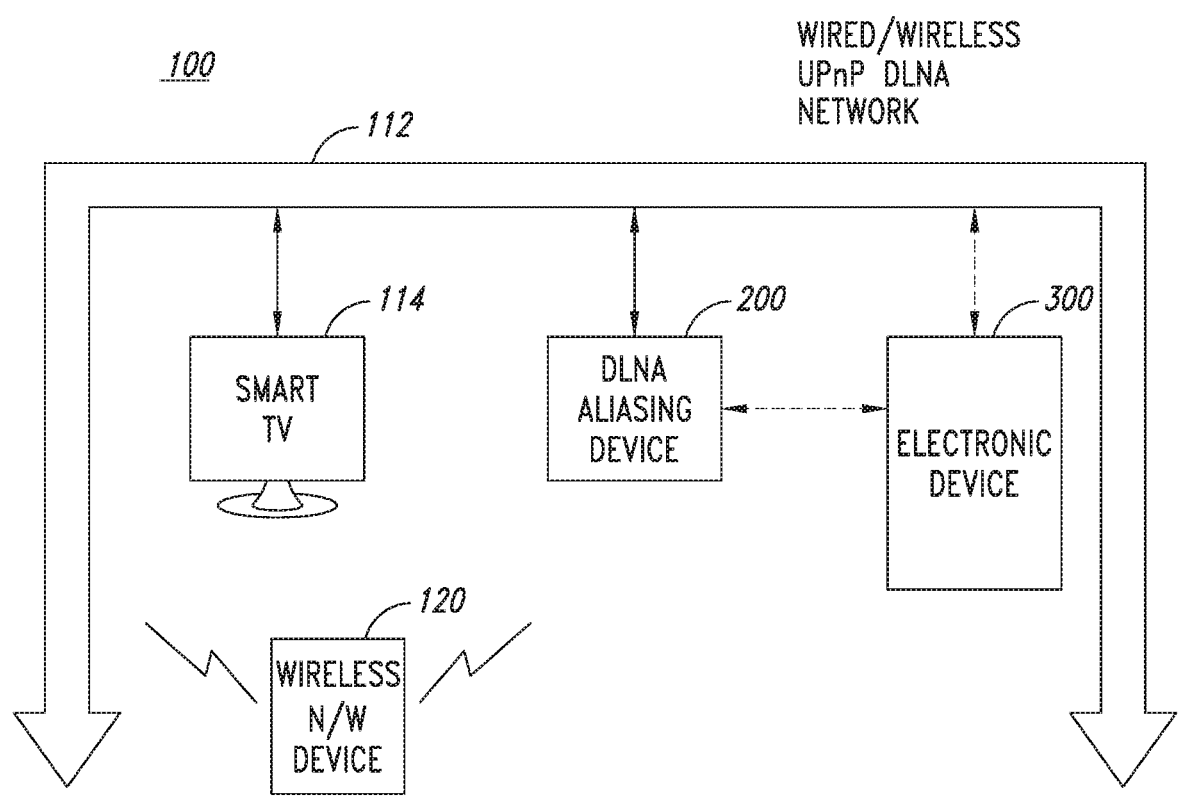
FIG. 2 is a DLNA-enabled home network embodiment incorporating a DLNA aliasing device.

FIG. 2 is a DLNA-enabled home network system 100 embodiment incorporating a DLNA aliasing device 200. The home network 112 is conforms to a Universal Plug and Play (UPnP) network standard or some other standard compatible with DLNA devices. In the embodiment of FIG. 2, the home network 112 includes wired and wireless functions, but in other embodiments, the network devices may be communicatively coupled exclusively via wired or wireless connections. In the embodiment of FIG. 2, one or more wireless networking devices 120 facilitate wireless communications of the network devices.

The DLNA-enabled home network system 100 embodiment of FIG. 2 also includes an electronic device 300. The electronic device 300 has an electronic interface that facilitates communication between the electronic device 300 and other electronic devices. In the embodiment of FIG. 2, which is non-limiting, the electronic device 300 is a wireless home weather station. The electronic device 300 may optionally include an interface to communicate via the home network 112. Alternatively, or in addition, the electronic device 300 may optionally include an interface to communicate directly with the DLNA aliasing device 200.

In FIG. 2, the electronic device 300 interfaces with the outside world in one or more ways. For example, the weather station electronic device 300 may receive weather related data from temperature sensors, humidity sensors, barometric pressure sensors, wind speed sensors, wind direction sensors, altimeters, motion sensors, and the like. The weather station electronic device 300 may be a single unit, or alternatively, the weather station electronic device 300 may comprise remote or otherwise separate sensors and weather data generating elements.

The weather station electronic device 300 generally includes computer processing capabilities for administering the device. For example, the weather station electronic device 300 may be able to gather data and predict a weather pattern based on the data.

The weather station electronic device 300 typically includes a user interface to provide, for example, information to users of the station such as temperature or a predicted weather pattern. In some cases, the user interface is a display or audio output device. In other additional or alternative cases, the user interface is a communication interface to an Internet server. In these cases, the weather data may be used independently or with other data collected from other weather station devices to populate a website with weather related information.

The weather station electronic device 300 includes a communication interface. The communication interface may be incorporated into the user interface or may be distinct from the user interface. The communication interface provides for passage of data to and/or from the weather station electronic device 300. In one example, an external electronic device communicates with the weather station electronic device 300 to request weather related data. The weather station electronic device 300 provides the weather related data to the external electronic device.

Turning back to FIG. 2, a non-limiting example of the DLNA-enabled home network embodiment 100 is described. The electronic device 300 is a weather station electronic device. In the embodiment, a user (not shown) is watching television programming on a smart TV 114. The smart TV 114 is a DLNA-enabled device configured as a digital media renderer/player (DMR/DMP). The user is interested in the local weather. The smart TV is unable to access any information directly from the weather station electronic device 300 because the weather station electronic device 300 is not DLNA-enabled. Nevertheless, the user is able to access data from the weather station electronic device 300 via the DLNA aliasing device 200.

The DLNA aliasing device 200 has a DLNA interface. The DLNA aliasing device 200 is presented on the home network 112 as a digital media server (DMS) having data files to share. In this case, the data files are snapshot image files of weather related data. Via the smart TV 114, the user sees a file system that includes a "current weather" image file conforming to a Joint Photographic Experts Group (i.e., JPEG, JPG, etc.) format. When the user directs his smart TV 114 to display the current weather JPEG file, the snapshot is rendered on the smart TV 114 screen.

The current weather JPEG file is generated by the DLNA aliasing device 200. Via a second non-DLNA interface, the DLNA aliasing device 200 establishes a communication link with the weather station electronic device 300 and retrieves various static weather related datums. The DLNA aliasing device 200 converts the retrieved data into a multimedia format file such as the current weather JPEG file. The DLNA aliasing device 200 further exposes the created file for sharing via a DLNA protocol, which is the mechanism used by the smart TV 114 to recognize and retrieve the file for display to the user.

Figure 3:
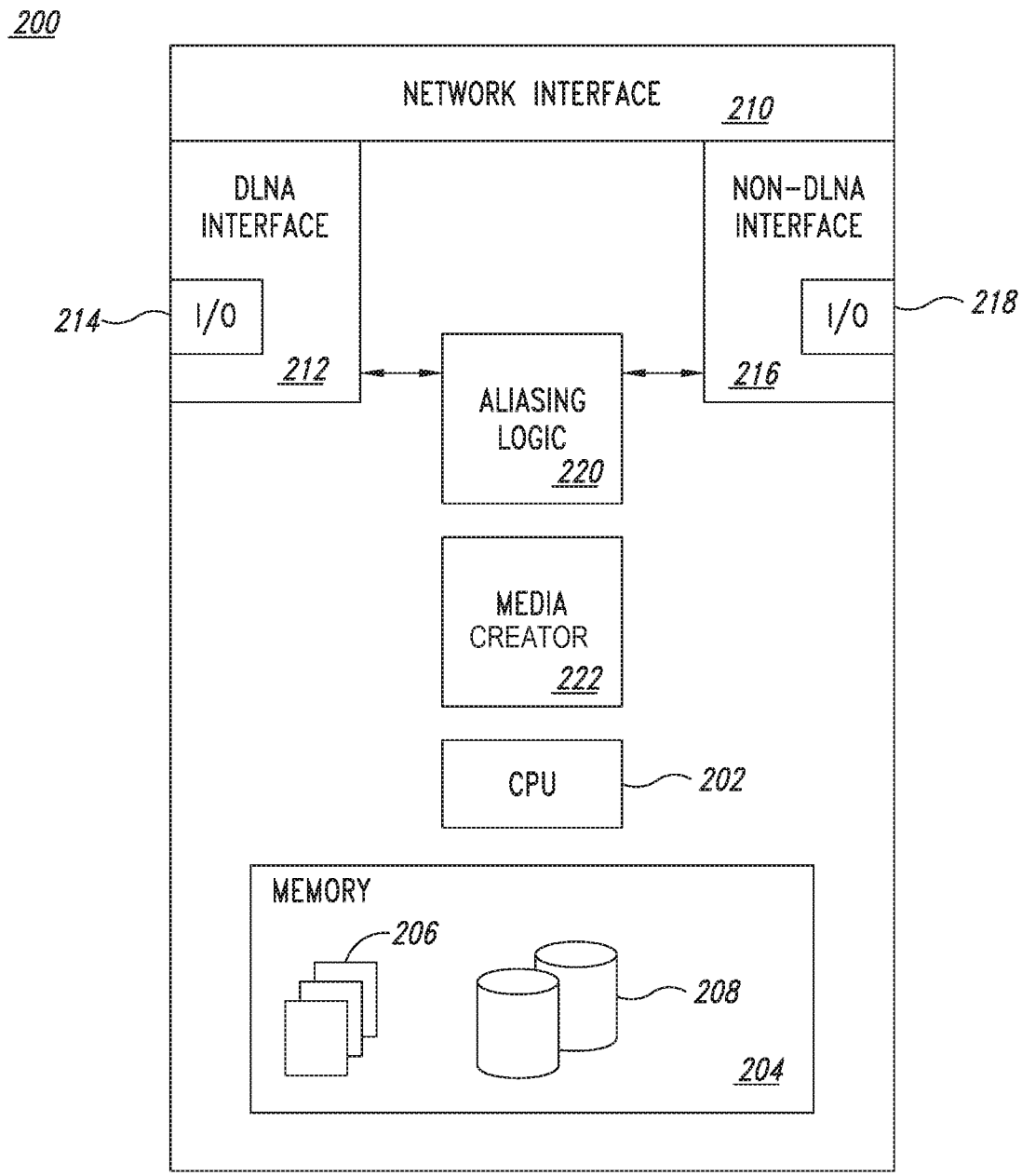
FIG. 3 is a block diagram of the DLNA aliasing device of FIG. 2.

FIG. 3 is a block diagram of the DLNA aliasing device 200 of FIG. 2. A central processing unit (CPU) 202 controls the operations of the DLNA aliasing device 200. The DLNA aliasing device 200 further includes a memory 204. In whole or in part, the memory 204 may be considered a non-transitory computer readable medium. Accordingly, the CPU 202 may be configured to read computer executable instructions and data from the memory or some portion thereof, and the instructions may be executed by the CPU 202. The executed software instructions direct the operations of the DLNA aliasing device 200.

Memory 204 is illustrated in FIG. 3 having included therein a file system 206 and a data repository 208. Other memory structures may also be included in memory 204. Memory 204 is configured such that one or more electronic devices may store and retrieve electronic data (e.g., software executable instructions, electronic data, and the like).

File system 206 provides an architected means of storing data in one or more organized "directories," "folders," and "files." The file system 206 may be used by the CPU 202 to store and retrieve electronic data or executable software instructions that are stored in a file format. The file system 206 further permits exposure of multimedia content to DLNA-enabled devices on a network.

Data repository 208 can be used to store multimedia files among other things. The multimedia files include files that conform to the mandatory formats of the DLNA protocol. For example, JPEG image files, LPCM audio files, and MPEG audio/video files may be stored in the repository 208. Alternatively, or in addition, files of other formats may also be stored in the repository 208. The "other" files may include image files having PNG, GIF, TIFF, MPO, PS, and other formats, audio files having AC3, AAC, MP3, WMA9, ATR AC3+ and other formats, and audio/video files having MPEG-1, MPEG-4, VC1, MPV1, Xvid, DivX, WMV, AVCHD, and other formats. The "other" files may also include HTM, HTML, SWF, EXE, and other files found on Internet servers, DOC, PDF, PPT, TXT, and other document presentation files, BAS, C, CPP, PY, RPY, XML, GEM, and other computer programming files, and files of many other formats.

External electronic devices may write data files, including data files that conform to a DLNA-acceptable format, to the DLNA aliasing device 200. The data files are transferred into the DLNA aliasing device 200 and stored in the data repository 208. The stored files can be manipulated, stored, retrieved, and edited via the file system 206.

External electronic devices may read data files, including data files that conform to a DLNA-acceptable format, from the DLNA aliasing device 200. The data files are retrieved from the data repository 208 and transferred out of the DLNA aliasing device 200 to the external electronic device.

Computer software instructions that are executable by CPU 202 are stored in memory 204. The executable instructions may direct the CPU 202 to pass data into and out of the DLNA aliasing device 200.

The DLNA aliasing device 200 of FIG. 3 includes one or more input/output interfaces. The interfaces may be wired or wireless interfaces. The interfaces may conform to a direct peer-to-peer standardized protocol such as digital video interface (DVI), high definition multimedia interface (HDMI), video graphics array (VGA), IEEE 1394 (FireWire), or some other peer-to-peer protocol. The interfaces may conform to a network protocol such as an Open Systems Interconnect (OSI, ISO/IEC 7498-1) seven layer protocol, universal serial bus (USB), or some other protocol. The interfaces may also conform to a proprietary or lesser known, standardized or un-standardized protocol. The interfaces may communicate data via a network formed with devices such as the network 112 and the wireless networking device 120 of FIG. 2, and alternatively or in addition, the interfaces may communicate data via another type device.

One interface included in the DLNA aliasing device 200 of FIG. 3 is network interface 210. Network interface 210 in the embodiment of FIG. 3 conforms to an OSI model. The network interface 210 in the embodiment of FIG. 3 further conforms to a UPnP protocol. The physical layer of network interface 210 may be wired (e.g., IEEE 802.3 wired local area network (LAN)) or wireless (e.g., IEEE 802.11 wireless). In some embodiments, network interface 210 is the only input/output interface of the DLNA aliasing device 200. In such cases, communications with multiple devices can be independently conducted via the network interface 210. In other embodiments, the DLNA aliasing device 200 also includes other input/output interfaces; however, communications with multiple devices can still be conducted via the network interface 210.

A second interface included in the DLNA aliasing device 200 embodiment of FIG. 3 is DLNA interface 212. Interface 212 exposes the DLNA aliasing device 200 as a DLNA-enabled device to other DLNA-enabled devices. For example, the DLNA interface 212 may make the DLNA aliasing device 200 appear on a network to be a DMS, DMP, DMR, DMC, DMPr, or some other DLNA type of device.

Typically, the DLNA aliasing device 200 communicates with the DLNA-enabled devices over a UPnP network accessed through network interface 210. Optionally, the DLNA aliasing device 200 may in addition or in the alternative communicate with another DLNA-enabled device through DLNA interface input/output port 214.

The DLNA interface 212 provides the framework to form and interpret DLNA messages and data packets. When another DLNA-enabled device sends information that is received by the DLNA aliasing device 200, the DLNA interface 212 is able to interpret the data bits of the received message and recognize the message as one that follows a DLNA protocol. The interpretation may involve grouping certain ones of the bits together to recognize certain device discovery and control structures defined by the DLNA protocol. In some cases, for example message acknowledgements, the DLNA interface 212 is arranged to recognize that a full message has been received and the interface 212 may automatically form and transmit an acknowledgement to the sending DLNA device.

The DLNA interface Input/Output (I/O) port 214 may be an electronic communications port directly connected to another DLNA device. The DLNA interface I/O port 214 may be a port connected to another network or to even the same network that network interface 210 is connected to. The DLNA interface I/O port 214 may be wired or wireless. For example, the DLNA interface I/O 214 port may conform to a multimedia protocol such as HDMI, DVI, or VGA. The DLNA interface I/O port 214 may conform to another type of multimedia or flexible communications protocol such as USB, IEEE 1394, IEEE 802.3, IEEE 802.11, RS-232, RS-422, RS-485, Infrared, or Bluetooth. In fact, the DLNA interface I/O 214 port may conform to any serial, serialized, or parallel communications protocol that is permitted by the Digital Living Network Alliance standard to carry DLNA communications.

The DLNA aliasing device 200 embodiment of FIG. 3 includes a third interface, non-DLNA interface 216. Non-DLNA interface 216 is provided to pass control and data information between the DLNA aliasing device 200 and one or more other electronic devices. The non-DLNA interface 216 may be coupled to the UPnP network through network interface 210. In other additional or alternative cases, the non-DLNA interface 216 may provide different connection capabilities through a non-DLNA interface I/O port 218.

The non-DLNA interface 216 may be configured to communicate with a particular external electronic device such as a particular type of weather station or family of weather stations. Alternatively, the non-DLNA interface 216 may be configured to communicate with many types of external electronic devices. In some cases, the non-DLNA interface 216 can automatically determine the type of external electronic device that is communicably coupled. In other cases, a user may provide input to direct the non-DLNA interface 216 as to the type of device that is communicably coupled. In still other embodiments, the DLNA aliasing device 200 may permit the non-DLNA interface 216 to be programmed to communicate with a particular type of external electronic device. Electronic devices coupled to the non-DLNA interface 216 are not DLNA-enabled devices.

The non-DLNA interface I/O port 218 is an electronic communications port that may be coupled to a non-DLNA-enabled electronic device. The non-DLNA interface I/O port 218 may be connected to a network (i.e., the same or a different network that network interface 210 is connected to). The non-DLNA interface I/O port 218 may be wired or wireless. The non-DLNA interface I/O port 218 port may conform to a multimedia protocol such as HDMI, DVI, or VGA. The non-DLNA interface I/O port 218 may conform to another type of multimedia or flexible communications protocol such as USB, IEEE 1394, IEEE 802.3, IEEE 802.11, RS-232, RS-422, RS-485, Infrared, Bluetooth, I$^2$C, SPI, PCI, CAN, or some other protocol. In fact, the non-DLNA interface I/O port 218 may conform to any serial, serialized, or parallel communications protocol.

In many cases, the non-DLNA interface I/O port 218 is formed with a traditional serial port driven by a universal asynchronous receiver/transmitter (UART). In many other cases, the non-DLNA interface I/O port 218 is formed with a set of general purpose I/O (GPIO) pins that are desirably configured as data pins, clock pins, control pins, power pins, or the like.

Aliasing logic 220 is arranged to coordinate the passage of information between a DLNA interface 212 and a non-DLNA interface 216. The Aliasing logic 220 may include modules having electronic circuitry, software functionality, or some combination of both.

In one simple case, aliasing logic 220 is configured to pass a file between a non-DLNA device and a DLNA device. In such a case, the file has a DLNA acceptable format. The aliasing logic 220 is directed to pass the file from one device to another. Accordingly, the aliasing logic 220 retrieves the file via one of the DLNA interface 212 and the non-DLNA interface 216 and passes it to the other interface. Retrieving the file may include formatting packets and/or messages to request the file, transmitting the packets and/or messages, receiving information back, and isolating the file from within the received information. The isolated file is then re-packaged according to the nature of the receiving device and transmitted to the device that is to receive the file.

In other cases, the electronic device connected through the non-DLNA interface 216 is not a file-based device or is configured to work with files that are not DLNA compatible. In such cases, the CPU 202 may execute formatting software modules (e.g., software routines, instructions, and the like) to particularly format communications with the external device such that data or other information is communicated.

A media creation module 222 is included in the DLNA aliasing device 200 illustrated in FIG. 3. The media creation module 222 may include modules having electronic circuitry, software functionality, or some combination of both electronic circuits and software. A media creation module 222 is configured to arrange data into a format that is compatible with a DLNA device.

In one embodiment, a media creation module 222 is configured to process static data that has been retrieved from an external non-DLNA type of device. For example, if the non-DLNA electronic device is a weather station, the static data may include such data as a time stamp, temperature, humidity, barometric pressure, wind speed, wind direction, predicted weather, and the like. From the static data, the media creator 222 may create or update a data file having a JPEG format. The media creator may generate image type data for background graphics, icons, symbols, and the like, and the media creator may format a single static datum or more of the retrieved static data into the JPEG file. In this manner, the static data from the weather station (or other electronic device) is converted into a multimedia format file, which can be shared with and rendered on a DLNA-enabled device.

The media creation module 222 in some cases is dedicated to a single function. For example, the media creation module 222 may be dedicated to formatting data into a file having a JPEG format. Alternatively, the media creation module 222 in some cases is configured to create files of many different formats. For example, if the external non-DLNA electronic device is an alarm system, an image file (e.g., JPEG, GIF, etc.) file may be created that shows the status of individual sensors in the system, history of triggered alarm sensors, a current status of the system, or some other static data. Alternatively, or in addition, the media creation module 222 may format audio data retrieved from the alarm system into a file wherein the audio data is live or recorded audio captured from the alarmed premises. The created audio file may have an LPCM, AC3, MP3, or some other format. In still another case, the media creation module 222 may retrieve audio/video data from the alarmed premises. In this embodiment, if the alarm system includes one or more cameras, the retrieved data may be audio/video data that is formatted by the media creation module 222 as an MPEG file, WMV file, or multimedia file of some other format.

In some cases, the media creation module 222 is a standalone module that has powerful encoding/decoding capabilities. In other cases, the media creation module 222 shares electronic and computing resources with other functions in the DLNA aliasing device 200. The external electronic non-DLNA device may be very sophisticated and arranged to produce a high volume of data. in such cases, the media creator 222 works to capture and reformat some or all of the high volume of data for sharing and consumption by a DLNA-enabled device.

In some embodiments, the media creation module 222 is configured to process data that is already in a DLNA acceptable format. The media creator 222 in these cases converts the data into a non-DLNA format. The converted data may then be communicated to one or more external electronic non-DLNA devices.

For example, an external electronic non-DLNA device is an appliance (e.g., oven, refrigerator, stove top, humidifier, de-humidifier, fan, air conditioner, HVAC system, etc.). The appliance is programmable, but not arranged with any compatibility to a DLNA system. In one case, a user of a DLNA-enabled smartphone creates an audio file having an MP3 format. The audio file is retrieved by the DLNA aliasing device 200, converted by a speech-to-text engine in the media creation module 222 into textual commands. The commands are then reformatted into instructions directed to the particular appliance, and the instructions are communicated to the appliance, which operates according to the instructions.

In another example, the external electronic non-DLNA device is an automotive device, a home security system, or some other device that is associated with a particular user. In this case, a snapshot, video, or audio-video file is created with a DLNA-enabled table or other device. The file or files may further include information such as a time stamp, bio-metric data, recorded password or other security information. When the file or files are passed into the DLNA aliasing device 200, the media creation module 222 may use image recognition modules, audio-to-text modules, or other interpretive functions to generate information that expressly identifies the particular user. The identification information can then be used to generate commands or data to control or direct the external non-DLNA device. If the device is a car, the car may be directed to remotely start its engine. If the car has a GPS device, the retrieved data may be a map that is interpreted and passed as coordinates to the GPS device. If the device is a security system, the identity of the user may be used to enable the system, disable the system, or perform some other function.

Figure 4:
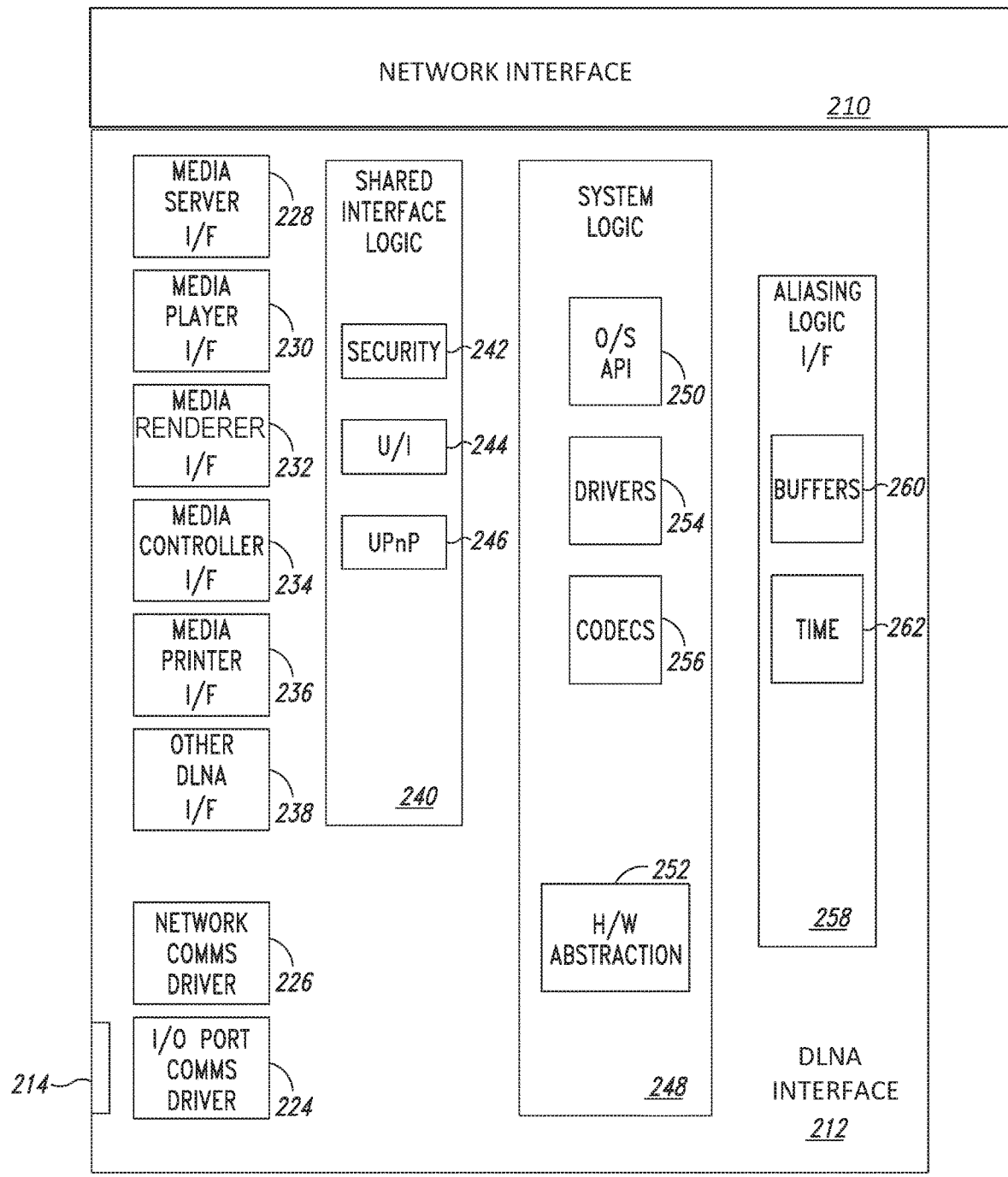
FIG. 4 illustrates a DLNA interface embodiment in more detail.

FIG. 4 illustrates a DLNA interface 212 embodiment in more detail. DLNA interface 212 is comprised of modules and sub-modules. The modules and sub-modules are formed as either physical modules that include shared or dedicated hardware circuits (and possibly software) or logical modules formed in software. In both cases, the modules and sub-modules are arranged in cooperation to carry out the functions of the DLNA interface 212.

Two modules in the DLNA interface 212 are an I/O port communications driver 224 and a network communications driver 226. The I/O port communications driver 224 is an abstraction layer that controls the operations of the DLNA interface I/O port 214. The network communications driver 226 is an abstraction layer that controls data communication through the network interface 210. The operative drivers 224, 226 of the respective ports permit data to be communicated through the DLNA interface 212. The I/O port communications driver 224 and the network communications driver 226 each provide a common interface or applications programming interface (API) to higher level functions within the DLNA interface 212. The I/O port communications driver controls the DLNA interface I/O port 214, which may conform to any serial, serialized, or parallel communications protocol. The network communications driver 226 provides a mechanism to cooperate with the network interface 210.

The DLNA aliasing device 200 can expose itself on a UPnP network as a DLNA device. Typically, this functionality is carried out through the network interface 210. In some cases, however, this functionality may be carried out through the I/O port 214. In one case, the DLNA aliasing device 200 does have network interface 210, but the device 200 does have a USB port (e.g., I/O port 214). In such a case, the USB port may be coupled to an external Ethernet-over_USB device, which provides connectivity to an Ethernet-based UPnP network. In another case, wherein the DLNA standard has evolved to include network connectivity via a non-Ethernet based protocol, the I/O port 214 is configured to communicate DLNA formatted messages through the I/O port 214.

One or more of six optional "personality" modules 228-238 are illustrated in the DLNA interface 212 embodiment of FIG. 4. The DLNA aliasing device 200 can take on the personality of one or more of the DLNA device classes by sending and/or receiving DLNA messages according to the particular personality of the aliased DLNA device type (i.e., DLNA device class).

In FIG. 4, for example, a media server interface 228 can be configured to make the DLNA aliasing device 200 appear on the network as a DLNA media server (DMS) device. Through the media server interface 228, which is configured to arrange, transmit, receive, and parse DLNA DMS messages, an external DLNA device would communicate with the DLNA aliasing device 200 as if the DLNA aliasing device 200 was a DMS device. In a similar manner, the DLNA aliasing device 200 is able to source or sink DLNA media files by optionally appearing as a DMP device via the media player interface 230, a DMR device via the media renderer interface 232, a DMC device via the media controller interface 234, or a DMPr device via the media printer interface 236. In other cases, the DLNA aliasing device 200 may also appear as some other type of DLNA device (e.g., M-DMS, M-DMP, M-DMC, M-DMU, M-DMD, MIU, M-NCF, and the like) by configuring the other DLNA interface 238 as necessary.

In order to alias one or more types of DLNA device, the DLNA aliasing device 200 includes a shared interface logic module 240. The shared interface logic module 240 provides a common architecture of functions used by one or more of the personality modules 228-238. In the embodiment of FIG. 4, the shared interface logic 240 includes an optional security sub-module 242, which may be used to encrypt or decrypt information passed through the DLNA interface 212. The security sub-module 242 may be arranged to operate with public keys, private keys, seed values, or some other values in a known encryption scheme. Additionally, or in the alternative, the security sub-module 242 may be used to implement digital rights management (DRM) functions of the aliased DLNA device.

The shared interface logic 240 in FIG. 4 includes an optional user interface (U/I) sub-module 244. The U/I sub-module 244 may provide an external human or computer user of the DLNA aliasing device 200 with physical or electronic input and/or output functionality. The U/I sub-module 244 may for example configure and drive a display, a speaker, a light source, a touch screen, a microphone, buttons, switches, analog-to-digital (A/D) converters, digital-to-analog (D/A) converters, biometric sensors, and the like.

The shared interface logic 240 in FIG. 4 includes a Universal Plug and Play (UPnP) sub-module 244. The UPnP sub-module 246 configures and directs the network functions to identify the DLNA aliasing device 200 on the network and communicate with other devices on the network. The UPnP sub-module 246 allows the DLNA aliasing device 200 to be gracefully added and removed from the network.

A high level system logic module 248 is included in the DLNA interface 212 of FIG. 4. The system logic module 248 provides functional logic sub-modules that can be accessed by functions outside of the DLNA interface 212 in order to direct operations within the DLNA interface. The system logic module also provides functional logic sub-modules to carry out the tasks of the DLNA interface 212.

An operating system (O/S) applications programming interface (API) sub-module recognizes function calls into the DLNA interface 212. In some embodiments, the O/S API sub-module 250 executes a message pump to receive and process incoming function calls and to generate and send outgoing messages, responses, or other function calls. The O/S API sub-module 250 may receive messages that direct the DLNA interface 212 to take on a particular DLNA personality (i.e., by enabling one of the personality modules 228-238). The O/S API sub-module 250 may receive other messages exposing a file system of shared files to other DLNA devices. The O/S API sub-module 250 may further pass information or complete messages that have been received by the DLNA interface 212 to higher level functions in the DLNA aliasing device 200. The incoming messages may satisfy requests for information from another external DLNA device. In some cases, via the system logic 248, the DLNA interface 212 may be subject to programmatic control from a remote computing device.

The system logic 248 includes a hardware abstraction layer (HAL) sub-module 252. The HAL 252 is generally arranged to map particular properties of the physical circuitry of the DLNA interface 212 such that modules of the DLNA interface 212 can address and control the circuitry via the HAL 252 map. For example, a physical address of a particular memory or I/O device of the DLNA interface 212 can be mapped to a global variable name in the HAL 252. When a module or sub-module of the DLNA interface 212 communicates with the physical address, the module or sub-module uses the global variable name. In this manner, a wide range of DLNA aliasing devices 200 can have different underlying circuitry, and a unique HAL 252 customized to the particular underlying circuitry can be implemented. Higher level functions in the modules and sub-modules can be common across the wide range of DLNA aliasing devices 200 since they use the common global names in the HAL 252.

Other sub-modules that may be included in the system logic 248 module include a drivers sub-module 254 and a codecs sub-module 256. The drivers of sub-module 254 may include circuits, software, or both to carry out certain functions of the DLNA interface 212 such as memory initialization, security key acquisition, user identity information, self-testing and the like. The codecs sub-module 256 may include circuits, software, or both to encode and decode data into or from a particular format. The codecs sub-module 256 may, for example, cooperate with the user interface sub-module 244 to provide input or output audio processing for the DLNA aliasing device 200 directly for a user of the DLNA aliasing device 200. The codecs sub-module 256 may provide video, touch (such as bio-metric processing), or other coding/decoding functions for a user of the DLNA aliasing device 200.

The DLNA interface 212 of FIG. 4 also includes an aliasing logic interface 258 module. The aliasing logic interface 258 provides a mechanism to pass data between the DLNA interface 212 and aliasing logic 220 (FIG. 3). Data bits, bytes, or other formatted structures are stored in data buffers 260. A timing sub-module 262 can be included in the aliasing logic interface 258 to coordinate the data transfer. In many cases, data is passed into the DLNA interface 212 from an external DLNA source at a different rate than the data can be processed by the DLNA aliasing device 200 and at a different rate than the data can be consumed by a non-DLNA external device (e.g., electronic device 300 of FIG. 2). Accordingly, similar or different timing differences may also occur with data passing from the non-DLNA external device through the DLNA aliasing device 200 to an external DLNA device coupled to the network. Alternatively or in addition, the timing sub-module can be used to schedule or periodically initiate data transfers.

Figure 5:
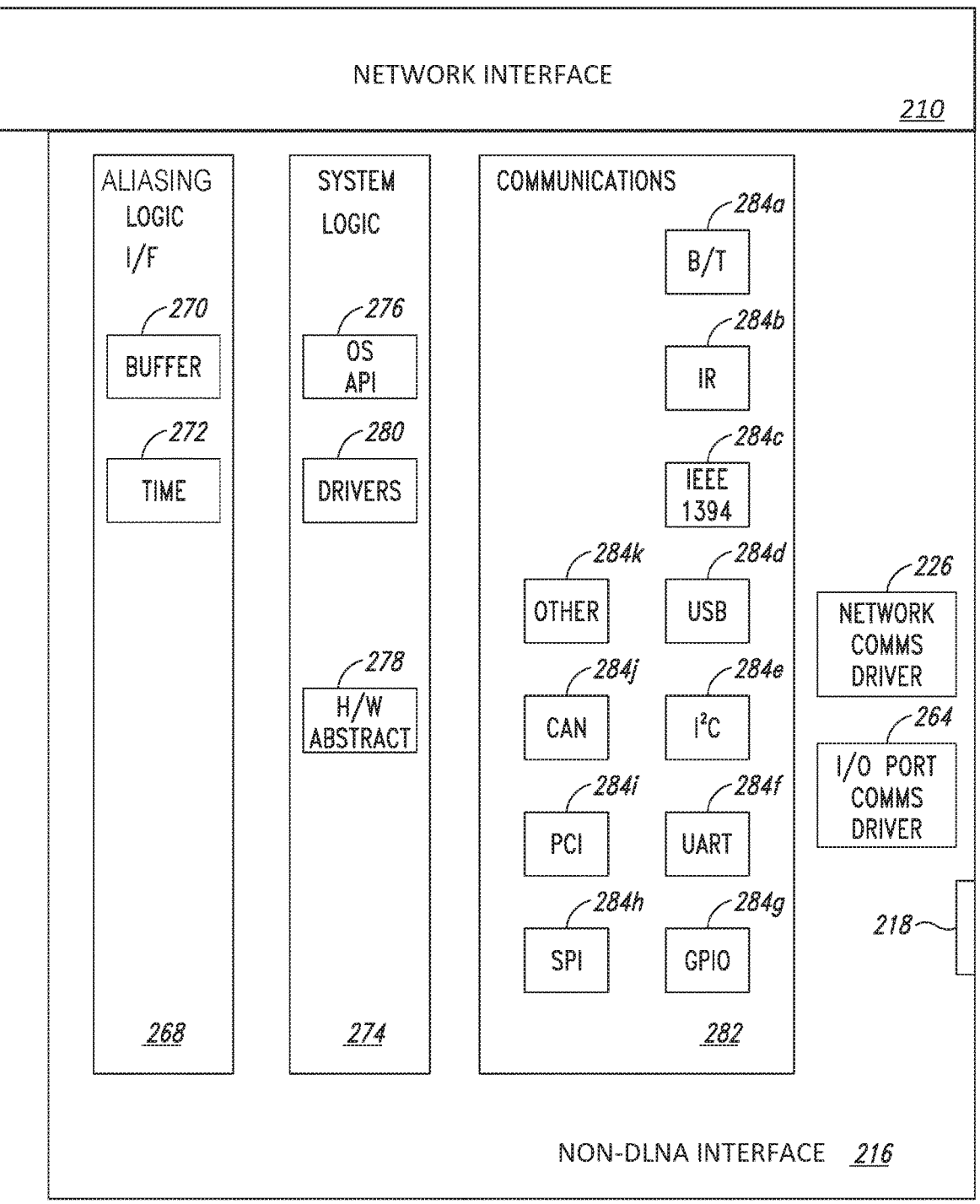
FIG. 5 illustrates a non-DLNA interface embodiment in more detail.

FIG. 5 illustrates a non-DLNA interface 216 embodiment in more detail. Non-DLNA interface 216 is comprised of modules and sub-modules. The modules and sub-modules are formed as either physical modules that include shared or dedicated hardware circuits (and software in some cases) or logical modules formed in software. The modules and sub-modules are arranged in cooperation to carry out the functions of the non-DLNA interface 216.

Two modules in the non-DLNA interface 216 embodiment of FIG. 5 are an I/O port communications driver 264 and a network communications driver 266. The I/O port communications driver 264 is an abstraction layer that controls the operations of the non-DLNA interface I/O port 218. The network communications driver 266 is an abstraction layer that controls data communications through the network interface 210. The operative drivers 264, 266 of the respective ports permit data to be communicated through the non-DLNA interface 216. The I/O port communications driver 264 and the network communications driver 266 each provide a common interface or applications programming interface (API) to higher level functions within the non-DLNA interface 216 or exposed to functions outside of the non-DLNA interface 216. The I/O port communications driver 264 controls the non-DLNA interface I/O 218 port, which may conform to any serial, serialized, or parallel communications protocol. The network communications driver 266 provides a mechanism to cooperate with the network interface 210.

The non-DLNA interface 216 includes an aliasing logic interface module 268 and a system logic module 274. The aliasing logic interface and system logic modules 268, 274 have corresponding modules 248, 258 in the DLNA interface 212. Accordingly, in some embodiments, the non-DLNA interface 216 may be programmatically controlled by a remote computing device.

For example, the system logic module 274 in the non-DLNA interface 216 of FIG. 5 provides functional logic sub-modules that can be accessed by functions outside of the non-DLNA interface 216. The functional logic sub-modules direct operations within the non-DLNA interface 216. The system logic module 274 provides functional logic sub-modules to carry out the tasks of the non-DLNA interface 216.

An O/S API sub-module 276 recognizes function calls into the non-DLNA interface 216. Similar to operations in the DLNA interface 212, the O/S API sub-module 276 may be arranged with a message pump to receive and process incoming function calls and to generate and send outgoing messages, responses, or other function calls. The O/S API sub-module 276 may receive messages that direct the non-DLNA interface 216 to communicate with a particular type of non-DLNA-enabled electronic device. In some embodiments, for example, the DLNA aliasing device 200 can be arranged to communicate with weather stations, appliances, automobiles, GPS devices, and many other types of devices. Particular function calls that are passed through the O/S API sub-module 276 can identify and configure the non-DLNA interface 216 for the chosen device. The O/S API sub-module 276 may receive other messages creating, populating, editing, and otherwise administering a file system of files that may be shared with DLNA-enabled devices. The O/S API sub-module 276 may further pass information or complete messages that have been received by the non-DLNA interface 216 to higher level functions in the DLNA aliasing device 200. The incoming messages may satisfy requests for information from external DLNA-enabled or non-DLNA-enabled devices.

System logic 274 is also illustrated to include a hardware abstraction layer (HAL) sub-module 278 and a drivers sub-module 280. Using techniques similar to those of HAL 252 (FIG. 4), the HAL 278 of the non-DLNA interface 216 is generally arranged to map particular properties of the physical circuitry of the non-DLNA interface 216. The drivers of sub-module 280 may also be formed using techniques that are the same or similar to the drivers of sub-module 254.

The non-DLNA interface 216 of FIG. 5 includes an aliasing logic interface 268 module. The aliasing logic interface 268 provides corresponding functions to the aliasing logic interface 258 of DLNA interface 212. That is, the aliasing logic 268 module provides a mechanism to pass data between the non-DLNA interface 216 and aliasing logic 220 (FIG. 3). Data is stored in data buffers 270. An optional timing sub-module 272, if included in the aliasing logic interface 268, coordinates data transfers that may occur between devices that have different timing characteristics and additionally or alternatively permits scheduled or periodic communication events.

The DLNA interface 212 of FIG. 4 and the non-DLNA interface 216 of FIG. 5 have several corresponding modules and sub-modules. In some cases, the modules and sub-modules are completely distinct. In other cases, the modules and sub-modules of DLNA interface 212 and non-DLNA interface 216 are logically separated according to their respective interface, but the modules and sub-modules physically share the same software and hardware circuits. For example, in some cases, a single HAL is arranged in the DLNA aliasing device 200. When the device is configured for a particular application, a single HAL maps all of the common and unique physical characteristics of the device to an expansive set of variables (or other logical software constructs) that is shared throughout the device. As another example, both the DLNA interface 212 and the non-DLNA interface 216 are illustrated as having a network communications driver module 226. Typically, the DLNA aliasing device 200 will only have a single network communications driver module 226, which is shared for communications with DLNA-enabled devices and for communication with network-ready non-DLNA devices. Other modules and sub-modules may also share software and hardware circuits.

The non-DLNA interface 216 of FIG. 5 includes a communications module 282. The communications module 282 has one or optionally more communications driver sub-modules. Illustrated in the communications module 282 of FIG. 5 are a Bluetooth sub-module 290a, an infrared (IR) sub-module 290b, an IEEE 1394 sub-module 290c, a USB sub-module 290d, an $I^2C$ sub-module 290e, a UART sub-module 290f, a GPIO sub-module 290g, an serial peripheral interface (SPI) sub-module 290h, a peripheral component interconnect (PCI) sub-module 290i, and a controller area network (CAN) sub-module 290j. An "other" sub-module 290k is configurable by a user for customization to a different communications protocol.

A non-DLNA-enabled external electronic device may provide one or more interfaces for electronic communications. In some cases, the interface conforms to a standard protocol. In other cases, the interface includes a proprietary set of interface paths (e.g., data pins, control pins, clock pins, etc.) and a particular sequence of signals passed on the interface paths. In such cases, the DLNA aliasing device 200 may include software instructions to configure the non-DLNA interface 216 to communicate according to the proprietary protocol.

Figure 6:
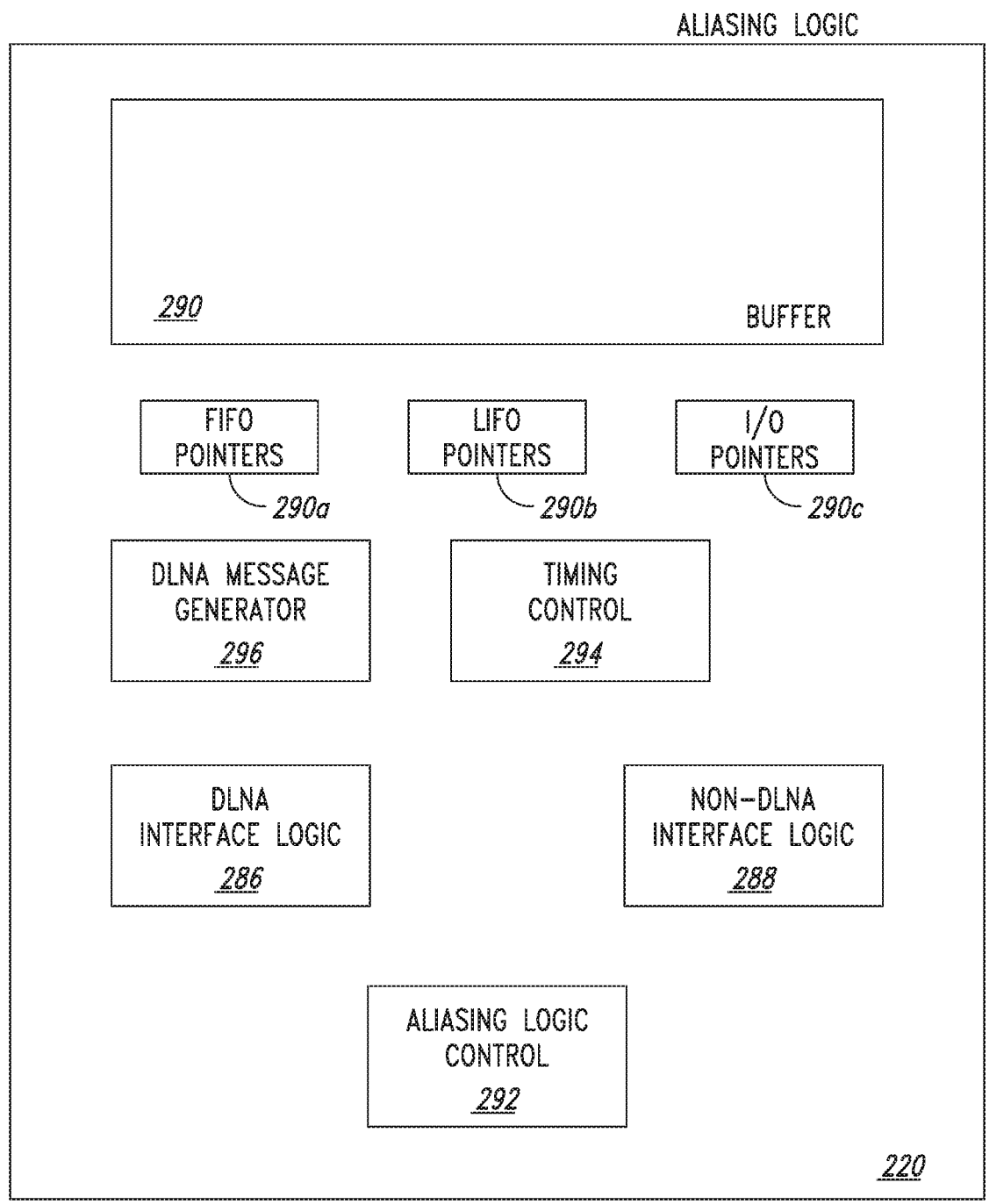
FIG. 6 is a detailed embodiment of aliasing logic.

FIG. 6 is a detailed embodiment of aliasing logic 220. A DLNA interface logic module 286 is configured to communicate with the aliasing logic interface 258 of the DLNA interface 212 (FIG. 4). A non-DLNA interface logic module 288 is configured to communicate with the aliasing logic interface 268 of the non-DLNA interface 216 (FIG. 5). The aliasing logic interfaces 286, 288 are configured to cooperate with their respective counterparts. Accordingly, the format, timing, streaming, packetizing, and other characteristics related to passing data, and in addition or alternative control information, is configured to match between the respective matching interfaces.

Data passing into or out from the aliasing logic 220 may be passed at different rates, bandwidths, sizes, formats, error management, and the like. For example, a UPnP network may permit data to be passed at 10 Mbits/second, 100 Mbits/second, or 1 Gbits/second. Accordingly, data communicated through the DLNA interface 212 may be passed at an associated rate. In contrast, data communicated to an electronic device through the non-DLNA interface 216 may be communicated at a similar rate or at a different rate. That is, if the non-DLNA device is configured to communicate via the UPnP network, data may be passed between devices through the aliasing logic 220 at a same or a similar rate. Alternatively, if the non-DLNA device is configured to communicate with the non-DLNA device via a different path, then the rates may vary widely.

In one example, referencing FIG. 1, a SmartTV 114 communicates with a DLNA aliasing device 200 via network 112 at up to 1 Gbit/second (e.g., gigabit Ethernet). An electronic device 300 communicates with a DLNA aliasing device 200 via a USB connection at 480 Mbits/second. In such a case, the DLNA aliasing device 200 is configured to throttle the data communicated between devices such that efficient communications can proceed. One aspect of data throttling occurs in the aliasing logic 220.

Aliasing logic 220 includes a storage buffer 290. In some embodiments, the storage buffer 290 is associated solely with the aliasing logic 220. In other embodiments, the storage buffer 290 is associated individually or in combination between the aliasing logic 220, the DLNA interface 212, the non-DLNA interface 216, or some other area of the DLNA aliasing device 200. In one embodiment, the storage buffer 290 is physically located in the memory 204 (FIG. 3).

The storage buffer may be configured as one or more individual storage buffers. One or more sets of pointers are used to store and retrieve data within the storage buffer 290. In some cases, all or part of storage buffer 290 is configured as a first-in, first-out (FIFO) buffer. In such cases, one or more sets of FIFO pointers 290a are configured. In some cases, all or part of storage buffer 290 is configured as a last-in, first-out (LIFO) buffer. In such cases, one or more sets of LIFO pointers 290b are configured. In still other cases, all or part of storage buffer 290 is configured as a straight input/output (I/O) buffer. In such cases, one or more sets of I/O pointers 290c are configured.

When the DLNA aliasing device 200 is in operation, data is communicated through the aliasing logic 220 via storage buffer 290. One or more pointers identify memory locations in the storage buffer 290 where data will be written. One or more pointers identify memory locations in the storage buffer 290 where data will be retrieved. The pointers may be updated automatically or programmatically.

An aliasing logic control module 292 directs operations of the aliasing logic 220. The aliasing logic control module 292 may initialize the storage buffer 290, the storage buffer pointers 290a-c, the interface logic 286, 288, a timing control module 294, a DLNA message generator 296, and some or all of the modules and sub-modules in the DLNA interface 212 and non-DLNA interface 216.

In some cases, the aliasing logic control module 292 controls pointers 290a-c and directs operations to transmit and receive data via the interface logic 286, 288. That is, the aliasing logic control module 292 may be configured to copy data through the interfaces and into and out from the storage buffer 290. In such cases, the aliasing logic control module 292 uses pointers 290a-c to determine where data should be written into storage buffer 290, and the aliasing logic control module 292 uses pointers 290a-c to determine where data should be read from storage buffer 290.

In other copy cases, aliasing logic control module 292 initializes pointers 290a-c and passes pointer values to one or both of the DLNA interface 212 and non-DLNA interface 216. In these cases, logic within the respective interface 212, 216 read and write data according to the pointers 290a-c.

The aliasing logic control module 292 works cooperatively with the timing control module 294. The timing control module 294 includes one or more clock functions. Alarms may be set in the timing control module 294. When an alarm is triggered, an interrupt may be triggered to direct the aliasing logic control module 292 to perform a particular function. The alarms in some cases are configured by a user. In other cases, alarms direct periodic operations in the aliasing logic control module 292.

For example, a periodic alarm may be repeatedly set (e.g., to trigger every 10 seconds, every 30 seconds, every 5 minutes, every hour, once per day, or some other time increment), and when the alarm triggers, the aliasing logic control module 292 may be directed to perform an update. In one embodiment, a periodic alarm directs the aliasing logic control module 292 to interrogate a non-DLNA electronic device and retrieve updated data (e.g., weather data). Upon retrieving the updated data, the aliasing logic control module 292 may then direct a media creator 222 (FIG. 3) to form the data into a DLNA-formatted file. The aliasing logic control module 292 may optionally trigger formation and transmission of a message via DLNA message generator 296. The message in the embodiment is useful to inform a DLNA device coupled to the aliasing device 200 that updated information is available.

The DLNA message generator 296 is directed by the aliasing logic control module 292. A DLNA system follows a DLNA protocol. When the aliasing logic control module 292 determines that particular messages are to be formed and transmitted, the DLNA message generator 296 is configured to form such messages. In many cases, the DLNA message generator 296 works in cooperation with logic embodied in the DLNA interface 212. The DLNA messages may include device discovery messages, control messages, error messages, authorization messages, and other messages defined in the DLNA protocol.

In one example, the aliasing logic control module 292 is operative to collect data from a non-DLNA electronic device and prepare the data for presentation on a DLNA device. In such a case, the aliasing logic control module 292 may start the operation via a user control, a programmatic control, an inquiry from the DLNA device, an alarm from timing control module 294, or via some other mechanism. Upon beginning the operation, the aliasing logic control module 292 directs the collection of data by passing directives through the non-DLNA interface logic module 288 to the non-DLNA interface 216. The data is retrieved from the non-DLNA electronic device and stored in a first location in storage buffer 290. Pointers 290a-c are updated accordingly. Subsequently, when some or all of the data is collected, the aliasing logic control module 292 directs the media creator module 222 to form the data into a DLNA media class file (Table 2). The aliasing logic control module 292 may pass the data directly, or the aliasing logic control module 292 may pass particular pointers that identify locations in storage buffer 290.

In the example, the media creator 222 is directed by the aliasing logic control module 292 as to the type of media class to create. The media creator 222 may create, for example, a JPEG image file that represents the data collected from the non-DLNA electronic device. In some cases, the media creator is configured to create predetermined content as part of the created media class file. In one example, a colored or patterned background is formed in the JPEG image file. In other cases, a corporate logo, an audio tone or compilation of tones, or other predetermined content is included in the media file.

The media creator 222 is configured to prepare one or more DLNA media class software files. For example, the media creator 222 is configured to prepare one or more types of image files, audio files, and audio/video files such as those identified in Table 2. In some cases, the media creator 222 is configured to accept input data having a particular format. The particular format permits the media creator to create the DLNA media class file with a known algorithm. In other cases, the media creator 222 may be configured to dynamically receive incoming data and directions regarding the format of the incoming data. In such cases, the media creator may be particularly configured to dynamically interpret incoming data and to encode or otherwise create the chosen media class file.

In some embodiments, the aliasing logic control module 292 directs the media creator 222 as to the proper type and format of the media class file. In some embodiments, the proper type and format of the media class file is automatically directed by the incoming data.

Upon creation of the media file, the aliasing logic control module 292 may further direct the DLNA message generator to create one or more updated messages to inform listening DLNA devices that the updated data has been prepared.

Figure 7:
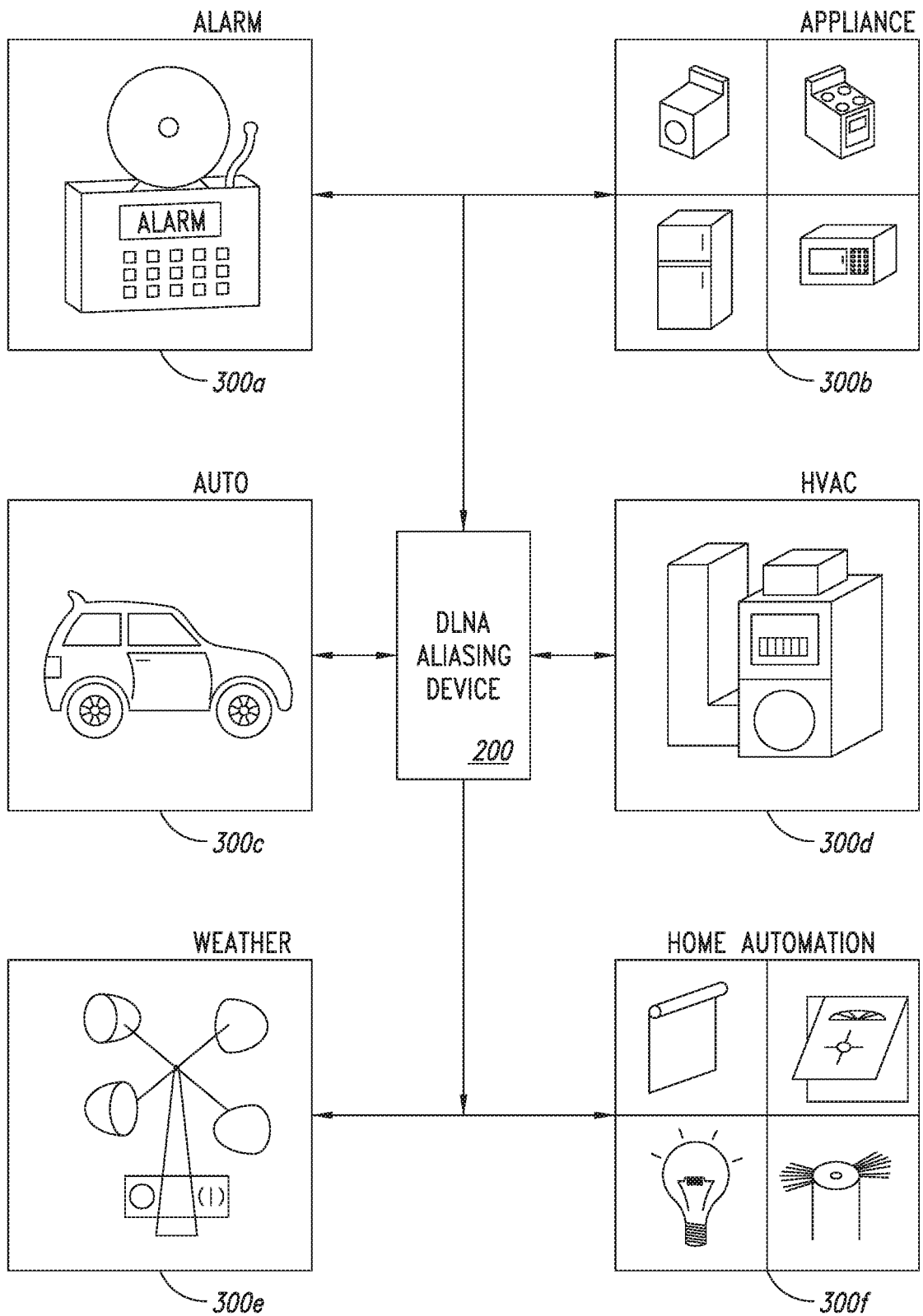
FIG. 7 illustrates a non-limiting collection of electronic devices that do not have a DLNA interface.

FIG. 7 illustrates a non-limiting collection of electronic devices 300a-f that do not have a DLNA interface. The electronic devices of FIG. 7 may each be configured with an electronic controller arranged to configure and operate the particular electronic device. Each of the electronic devices 300a-f illustrated in FIG. 7 may operate as an electronic device 300 of FIG. 2.

A DLNA aliasing device 200 may be optionally coupled to one or more of the electronic devices 300a-f illustrated in FIG. 7. In some cases, the DLNA aliasing device 200 is coupled to one electronic device only. In some cases, the DLNA aliasing device 200 is coupled to a first electronic device, de-coupled from the first electronic device, and then subsequently coupled to a second electronic device. In still other cases, the DLNA aliasing device 200 is concurrently coupled to two or more electronic devices.

The DLNA aliasing device 200 may be manually or programmatically configured to appear on a DLNA compatible network to be a as Digital Media Server (DMS), a Digital Media Controller (DMC), or some other DLNA device. In some cases, the DLNA aliasing device 200 may appear on the network as more than one type of DLNA device. A DLNA enabled device such as a SmartTV 114 (FIG. 2) communicate information to and additionally or alternatively from an electronic device 300a-f via the DLNA aliasing device 200.

In some cases, a particular status is electronically retrieved from the electronic device via a DLNA aliasing device 200. The DLNA aliasing device 200 reformats the retrieved data into one or more files of a particular DLNA media class, and the DLNA aliasing device 200 provides messaging updates to DLNA devices attached to a network regarding the availability of the updated data.

In some cases, a DLNA device will retrieve and present information from an electronic device, the information being generated by a DLNA aliasing device 200. Based on the presentation, a user of the DLNA device may wish to retrieve additional information from the electronic device or provide control information back to the electronic device. In such cases, certain DLNA messages from the DLNA device may be received by the DLNA aliasing device 200, and the DLNA aliasing device 200 may interpret the messages as a request to provide control information back to the electronic device. Several non-limiting examples of data communications between DLNA devices and non-DLNA devices are now described, and many other types of non-DLNA devices are also contemplated.

In FIG. 7, an alarm system 300a may operate as a non-DLNA electronic device. The alarm system may be a fire alarm, smoke alarm, security alarm, or some other type of alarm. The alarm system 300a may include operative control devices and sensing devices (not shown). The DLNA aliasing device 200 may interrogate a status of the alarm system 300a to retrieve information such as armed/disarmed status, sensor faults, sensor trips, historical data, user codes, and the like. In some cases, the alarm system 300a produces multimedia information (e.g., audio, video, and the like). The DLNA aliasing device 200 may interrogate the alarm system 300a via a non-DLNA interface, collect data, format the data into one or more DLNA media class files (e.g., JPEG image data, LPCM audio data, MPEG audio/video data, etc). The DLNA aliasing device 200 may then inform and present the DLNA media class information to a DLNA-enabled device. In some cases, a user may provide input information embedded in a DLNA message. The DLNA aliasing device 200 is configured to parse an incoming DLNA message, convert the message to a format compatible with the alarm system 300a, and pass the newly formatted command information to the alarm system 300a. The formatted command information may include arm/disarm commands, set/clear sensor status commands, generate status information commands, purge historic data commands, and other commands as well.

FIG. 7 illustrates a collection of appliances 300b. The illustrated collection includes a laundry machine such as a washer or dryer, a stove/oven appliance, a refrigerator, and a microwave oven. Such appliances typically include embedded controllers that permit some type of programmatic control or requests for status information. For example, certain refrigerators may be arranged to read electronic codes of food items stored therein. When such food items are removed for a certain period of time, the refrigerator may automatically determine that a need exists to replace the item. In these types of circumstances, where an appliance may have status information to present, the DLNA aliasing device 200 is configured to interrogate the appliance, retrieve the information, and present the information via a DLNA-enabled device. As another example, the appliance may be configured to receive control information. That is, a refrigerator/freezer may be configured to programmatically receive cooling temperature setting information, an oven, range, or microwave may be configured to receive heating temperature information or timing information, and a laundry machine may be configured to receive timing information, temperature information, an optionally, detergent and/or fabric softener information. The DLNA aliasing device 200 is cooperatively configured to communicate data between the non-DLNA electronic appliance 300b and a DLNA-enabled device.

A DLNA aliasing device 200 may also be coupled to an automotive electronic device 300c. Typically, via a proprietary wireless protocol or an open network wireless protocol (e.g., BLUETOOTH), the DLNA aliasing device 200 may communicate with an electronic system of an automobile. The DLNA aliasing device 200 may provide status information from the automotive electronic device 300c to a DLNA-enabled device. The DLNA aliasing device 200 may provide control information to the automotive electronic device 300c. The information may include global positioning system (GPS) geographic or timing information, security system information, engine system information, entertainment system information, remote start information, and the like. For example, in one system, a DLNA aliasing device 200 may be able to retrieve information related to a trip previously taken or currently underway by the respective automobile. The information may be communicated via a cellular link between the DLNA aliasing device 200 and the automobile. A series of images or multimedia data may be created to by the DLNA aliasing device 200 for presentation on a SmartTV. The presentation may include moving maps illustrating the geographic position of the automobile, satellite imagery of the location or video camera data may be presented, audio data captured from inside the automobile may be presented, engine statistics such as speed, fuel level, fuel efficiency, and the like may also be presented. In some cases, a user of the DLNA-enabled device may be able to pass video, audio, or text information as a file to the DLNA aliasing device 200, which in turn passes the information in the same or in a different format to the automobile.

A heating, ventilation, air conditioning (HVAC) system 300d may be coupled to a DLNA aliasing device 200. The HVAC system 300d may provide status information that is re-formatted into a DLNA media class file for presentation on a DLNA-enabled device. In one case, the DLNA aliasing device 200 is configured with predetermined imagery that depicts the HVAC system installed in a particular home. The DLNA aliasing device 200 interrogates the HVAC system 300d for status information such as temperature settings, vent orientation, temperature readings, and the like. The information received from the HVAC system 300d is superimposed on a DLNA media class image file (e.g., JPEG file), and the created image file is made available for presentation via a DLNA-enabled device. The DLNA aliasing device 200 may further receive DLNA input messages from the DLNA-enabled device, which the DLNA aliasing device 200 interprets to control the HVAC system 300d. In some cases, the HVAC system 300d includes hot water heating equipment, humidifier equipment, dehumidifier equipment, ceiling fans, and other environmental control systems.

FIG. 7 includes a weather station electronic device 300e.

FIG. 7 includes one or more home automation electronic devices 300f. The home automation electronic device 300f illustrates an automated electronic window blind/shade system, a garage door system, a lighting system, and a sprinkler system. Other home automation systems are also contemplated. In a manner akin to other electronic devices 300a-e as described herein, a home automation electronic device 300f may provide status information that may be formatted with the DLNA aliasing device 200 into one or more DLNA media class files. The created files may include only information from the electronic device, or the created files may also include pre-programmed data.

In some systems, certain functions of a DLNA aliasing device are packaged in a software application that can operate on a DLNA-enabled device. For example, a SmartTV include such an application. In such a system, the certain DLNA aliasing device functionality may operate to receive user input from the DLNA-enabled device and create certain DLNA-media class files. If the DLNA-enabled device is configured as an exemplary DMS, the DLNA-enabled device may make the created DLNA-media class file available via the DLNA-enabled network. In such a case, a DLNA aliasing device 200 may recognize the created file, retrieve the created file, and parse the created file into control information that is passed back to the electronic device 300a-f. In such an embodiment, the system is enabled to operate as if one DLNA aliasing device is communicating with another DLNA aliasing device 200.

Figure 8:
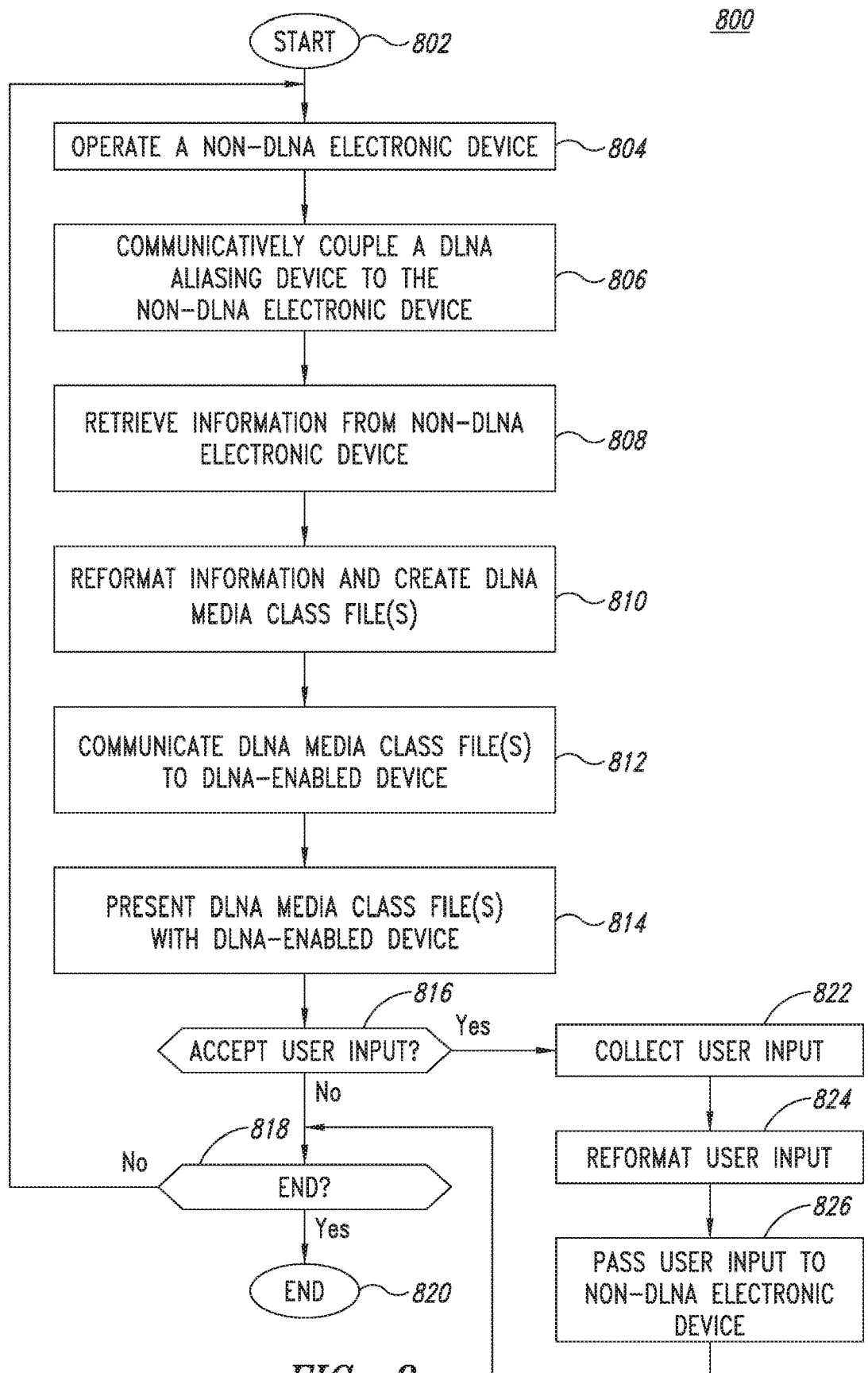
FIG. 8 is a flowchart representing a system that includes operations of at least one DLNA-enabled device, at least one DLNA aliasing device, and at least one electronic device.

FIG. 8 is a flowchart 800 representing a system that includes operations of at least one DLNA-enabled device 114, at least one DLNA aliasing device 200, and at least one electronic device 300a-f. The operations of the system begin at 802.

With respect to the system exemplified in FIG. 8, operations begin at 802. At 804, a non-DLNA electronic device is operated. The non-DLNA electronic device may represented as 300a-f of FIG. 7, or the non-DLNA electronic device may be some other type. A DLNA aliasing device is communicatively coupled to the non-DLNA electronic device at 806.

In some cases, the system may pend at the operations of 804, 806, or another point. During the time the system is pending, the non-DLNA electronic device will be operating and producing data, but the data may or may not be retrieved by the DLNA aliasing device. Instead, the DLNA aliasing device may merely advertise the availability of data to DLNA devices coupled to the network. In this way, processing time, power, network resources, and the like may be conserved. Subsequently, a DLNA device request may cause the interrogation of the non-DLNA device by the aliasing device and the creation of the data file to be delivered.

Communication may be via network or via some other communication medium. The DLNA aliasing device is configured to retrieve information from the non-DLNA electronic device at 808, and at 810, the DLNA aliasing device is configured to reformat the retrieved information and create at least one DLNA media class file. When more than one DLNA media class file is created, each file may conform to the same class or some files may conform to different media classes. For example, the DLNA aliasing device may create one or more image files, and the DLNA aliasing device may concurrently or sequentially create one or more multimedia files. Via a DLNA-enabled network such as a UPnP network, the DLNA aliasing device communicates the DLNA media class file(s) to one or more DLNA-enabled devices at 812.

At 814, at least one DLNA-enabled device presents the DLNA media class file(s). A user, having taken notice of the DLNA media class file(s), may or may not provide user input. The determination of whether or not to take user input is illustrated at 816. If no user input is accepted, a determination is made at 818 as to whether or not processing will continue. For example, if a user is merely retrieving data from a weather station 300e, the data may be presented on a DLNA-enabled SmartTV, and the user may then wish to terminate the operation. If the operation is terminated, processing ends at 820. If processing is not terminated, the operations may continue at 804.

When user input is accepted at 816, processing continues to 822 where the user input is collected. The input may be, for example, via a remote control device associated with a SmartTV. The SmartTV may generate a DLNA message, which is passed to the DLNA aliasing device and reformatted at 824. In some cases, standard DLNA messaging that occurs in a particular sequence is interpreted by the DLNA aliasing device as requesting particular action. In other cases, the DLNA-enabled device (e.g., SmartTV) includes some functionality of a DLNA aliasing device, and particular messaging is created and passed to the DLNA aliasing device. The particular messaging cooperates with the functions of the DLNA aliasing device. In some cases, the user input is processed only by the DLNA aliasing device. In other cases, the user input is reformatted and passed to the non-DLNA electronic device. Upon reformatting at 824, the user input is passed to the non-DLNA electronic device. If the user input represents control information, the non-DLNA electronic device is configured to act on the control information. Processing returns to 818, which determines whether or not processing should continue. If the processing is not required to continue, processing terminates at 820.

FIG. 8 is a flowchart illustrating one or more processes that may be used by embodiments of a system that includes DLNA-enabled devices, DLNA aliasing devices, and non-DLNA electronic devices. In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

FIGS. 1-7 illustrate portions of non-limiting embodiments of computing devices. The computing devices include operative hardware found in a conventional computing device apparatus such as one or more central processing units (CPU's) and/or digital signal processors (DSP's), volatile and non-volatile memory, communication bus architectures, serial and parallel input/output (I/O) circuitry compliant with various standards and protocols, wired and/or wireless networking circuitry (e.g., a communications transceiver).

As known by one skilled in the art, a computing device has one or more memories (e.g., memory 204 of FIG. 3 and buffer 290 of FIG. 6), and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to executed by a CPU.

The computing devices may further includes operative software found in a conventional computing device such as an operating system, software drivers to direct operations through the I/O circuitry, networking circuitry, and other peripheral component circuitry. In addition, the computing devices may include operative application software such as network software for communicating with other computing devices, database software for building and maintaining databases, and task management software for distributing the communication and/or operational workload amongst various CPU's. In some cases, the computing devices are a single hardware machine having the hardware and software listed herein, and in other cases, the computing devices are a networked collection of hardware and software machines working together to execute the functions of the DLNA-aliasing device 200 or other devices. Some aspects of the conventional hardware and software of the computing devices (e.g., buses, power supplies, user input/output circuits, operating systems, device drivers, and more) are not shown in the figures for simplicity.

Certain figures included herein illustrate one or more DLNA aliasing devices or operations therein. In some embodiments, a DLNA aliasing device can be controllably configured to appear as one type of DLNA device at one time and another type of DLNA device at another time. In some embodiments, a DLNA aliasing device has two or more network connections. A single DLNA aliasing device can concurrently appear as two or more different types of DLNA devices. In some embodiments, a DLNA aliasing device is a standalone piece of hardware having software incorporated therein. In other embodiments, the DLNA aliasing device is incorporated into a non-DLNA-enabled electronic device, a DLNA-enabled electronic device, or some other electronic device. A DLNA aliasing device may be embodied in a single integrated circuit. Alternatively, or in addition, a DLNA aliasing device may be embodied on a die in an integrated circuit that has the ability to perform other functions.

A network, as used herein, may be a Universal Plug and Play (UPnP) network. The network may include other non-UPnP network components. The network may include wired components, wireless components, or a combination of wired and wireless components. The network may be configured in a home, a neighborhood, a work environment, a restaurant, a bar, a sporting complex, an entertainment venue, or in some other location. Accordingly, such network may be interchangeably described as a network or a home network.

Data that is "static," as the term is used herein, implies data that may not change at all and data that may change over time. Static data may include a snapshot of dynamic data. For example, weather data, such as temperature, wind speed, air pressure, and the like may be static data. Serial numbers, model numbers, identifiers, and the like may also be static data. Static data (i.e., individual datums and a plurality of datums) may be stationary, motionless, immobile, constant, unmoving, at a standstill, resting, temporally steady, stable, and slowly changing.

In the foregoing description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The various embodiments described above can be combined to provide further embodiments. Aspects of the embodiments can be modified and changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A Digital Living Network Alliance (DLNA) aliasing apparatus, comprising:
   a network interface;
   aliasing logic;
   a DLNA interface in direct communication with the network interface and in separate direct communication with the aliasing logic, wherein the DLNA interface exposes the DLNA aliasing apparatus as a DLNA-enabled device to a DLNA device that is in communication with the network interface;
a non-DLNA interface in direct communication with the network interface and in separate direct communication with the aliasing logic, wherein the non-DLNA interface exposes the DLNA aliasing apparatus as a non-DLNA-enabled device to a non-DLNA device that is in communication with the network interface; and
a processor coupled to the aliasing logic and arranged to execute software instructions to:
establish a communications link between the aliasing logic and the non-DLNA device, wherein communications sent to and received from the non-DLNA device are passed through the non-DLNA interface and the network interface;
retrieve at least one static datum from the non-DLNA device;
convert the at least one static datum to a multimedia format file; and
enable sharing of the multimedia format file with the DLNA device via a DLNA protocol by passing data through the DLNA interface to the network interface for access by the DLNA device.

2. The DLNA aliasing apparatus of claim 1 wherein the DLNA apparatus is embedded in a weather station device.

3. The DLNA aliasing apparatus of claim 1 wherein the multimedia format file conforms to at least one Joint Photographic Experts Group (JPEG) image file format.

4. The DLNA aliasing apparatus of claim 1 wherein the multimedia format file conforms to at least one Moving Pictures Expert Group (MPEG) video encoding protocol.

5. The DLNA aliasing apparatus of claim 1 wherein the processor coupled to the aliasing logic is further arranged to execute software instructions to:
communicate the multimedia format file via the DLNA interface to a DLNA-enabled device via a Universal Plug and Play (UPnP) network.

6. The DLNA aliasing apparatus of claim 5 wherein the DLNA-enabled device is configured as a Digital Media Player (DMP) or Mobile Digital Media Player (M-DMP) device.

7. The DLNA aliasing apparatus of claim 5 wherein the processor coupled to the aliasing logic is further arranged to execute software instructions to:
expose a file system structure to DLNA-enabled devices coupled to the UPnP network.

8. The DLNA aliasing apparatus of claim 1 wherein the processor coupled to the aliasing logic is further arranged to execute software instructions to:
automatically transmit a DLNA acknowledgement message in response to a received DLNA message.

9. The DLNA aliasing apparatus of claim 5 wherein the processor coupled to the aliasing logic is further arranged to execute software instructions to:
expose the DLNA aliasing apparatus as a Digital Media Server (DMS) apparatus at a first time; and
expose the DLNA aliasing apparatus as at least one of a Digital Media Player (DMP), a Digital Media Renderer (DMR), and a Digital Media Controller (DMC) at a second time.

10. A system, comprising:
a Digital Living Network Alliance (DLNA) compatible network;
a non-DLNA compatible device; and
a DLNA aliasing apparatus, the DLNA aliasing apparatus including:
a network interface in communication with the DLNA compatible network and the non-DLNA compatible device;
aliasing logic;
a DLNA interface in direct communication with the network interface and in separate direct communication with the aliasing logic, wherein the DLNA interface includes a first aliasing logic interface in communication with the aliasing logic and a first network communications driver in communication with the network interface to expose the DLNA aliasing apparatus as a DLNA-enabled device to a DLNA deice that is in communication with the network interface;
a non-DLNA interface in direct communication with the network interface and in separate direct communication with the aliasing logic, wherein the non-DLNA interface includes a second aliasing logic interface in communication with the aliasing logic and a second network communications driver in communication with the network interface to expose the DLNA aliasing apparatus as a non-DLNA-enabled device to a non-DLNA device that is in communication with the network interface; and
wherein the aliasing logic is arranged to coordinate passage of information between the DLNA interface and the non-DLNA interface via the first aliasing logic interface and the second aliasing logic interface.

11. The system of claim 10 wherein the non-DLNA compatible device is a weather station.

12. The system of claim 10 wherein the non-DLNA compatible device is an electronic device selected from the group of a refrigerator, a laundry machine, and a device configured to cook food.

13. The system of claim 10 wherein the non-DLNA compatible device is an electronic device associated with an automobile.

14. The system of claim 10 wherein the DLNA aliasing apparatus is integrated within the non-DLNA compatible device.

15. The apparatus of claim 1 wherein the at least one static datum is non-multimedia data.

16. The apparatus of claim 1 wherein the at least one static datum is static weather data.

17. The apparatus of claim 1 wherein the at least one static datum is data indicating one or more of: a weather time stamp, temperature, humidity, barometric pressure, wind speed, wind direction, predicted weather.

* * * * *